US009332504B2

(12) United States Patent
Cheng et al.

(10) Patent No.: US 9,332,504 B2
(45) Date of Patent: May 3, 2016

(54) SYSTEM AND METHOD FOR SELF-OPTIMIZED UPLINK POWER CONTROL IN A FIXED WIRELESS BACKHAUL NETWORK

(71) Applicant: BLiNQ Wireless Inc., Ottawa (CA)

(72) Inventors: Ho Ting Cheng, Stittsville (CA); Taiwen Tang, Ottawa (CA); Terasan Niyomsataya, Ottawa (CA); Radu Bogdan Selea, Vaughan (CA)

(73) Assignee: BLiNQ Wireless Inc., Ottawa (CA)

( * ) Notice: Subject to any disclaimer, the term of this patent is extended or adjusted under 35 U.S.C. 154(b) by 2 days.

(21) Appl. No.: 14/462,859

(22) Filed: Aug. 19, 2014

(65) Prior Publication Data

US 2015/0055497 A1 Feb. 26, 2015

Related U.S. Application Data

(60) Provisional application No. 61/868,771, filed on Aug. 22, 2013.

(51) Int. Cl.
*H04L 1/00* (2006.01)
*H04W 52/14* (2009.01)
(Continued)

(52) U.S. Cl.
CPC ............ *H04W 52/146* (2013.01); *H04W 16/10* (2013.01); *H04W 52/143* (2013.01);
(Continued)

(58) Field of Classification Search
CPC ............ H04W 52/146; H04W 52/242; H04W 52/241; H04W 52/143; H04W 52/34; H04W 52/262; H04W 52/386; H04W 52/50; H04W 24/02; H04W 16/10
USPC ................................................ 370/252, 329
See application file for complete search history.

(56) References Cited

U.S. PATENT DOCUMENTS

2011/0136533 A1 6/2011 Senarath et al.
2012/0133557 A1 5/2012 Beaudin
(Continued)

FOREIGN PATENT DOCUMENTS

WO 2012037643 A1 3/2012
WO 2013000068 A1 1/2013

OTHER PUBLICATIONS

Simonsson, A.; Furuskar, A., "Uplink Power Control in LTE—Overview and Performance: Principles and Benefits of Utilizing rather than Compensating for SINR Variations," Vehicular Technology Conference, 2008. VTC 2008—Fall. IEEE 68th, vol., No., pp. 1-5, Sep. 21-24, 2008, which describes a method using Fractional Power Control (FPC).

*Primary Examiner* — Phuc Tran

(74) *Attorney, Agent, or Firm* — de Wilton Intellectual Property Inc.

(57) ABSTRACT

A system and method of uplink power control in a fixed wireless backhaul network, wherein determining an uplink transmit power of each remote backhaul module (RBM) comprises obtaining an interference-over-thermal (IoT) noise value of each hub, determining a target IoT noise value for each RBM, determining a total path loss from each RBM to its serving hub, determining a target uplink carrier to interference and noise ratio (CINR) for the RBM, and computing the RBM uplink transmit power for each RBM by summing the target IoT noise value for the RBM, the total path loss of the RBM to its serving hub, and the target uplink CINR. Computationally expensive parameter sweeps are avoided. The method can be implemented using a centralized processing unit or distributed processing at each node. The method is self-optimizing, and initial hub and RBM transmit powers and other data may be estimated using pre-deployment tools.

20 Claims, 7 Drawing Sheets

(51) Int. Cl.

| | |
|---|---|
| ***H04W 52/24*** | (2009.01) |
| ***H04W 16/10*** | (2009.01) |
| ***H04W 52/34*** | (2009.01) |
| ***H04W 52/26*** | (2009.01) |
| ***H04W 52/38*** | (2009.01) |
| ***H04W 52/50*** | (2009.01) |
| *H04W 24/02* | (2009.01) |

(52) U.S. Cl.
CPC .......... *H04W52/241* (2013.01); *H04W 52/242* (2013.01); *H04W 52/262* (2013.01); *H04W 52/34* (2013.01); *H04W 52/386* (2013.01); *H04W 52/50* (2013.01); *H04W 24/02* (2013.01)

(56) References Cited

U.S. PATENT DOCUMENTS

| | | | | |
|---|---|---|---|---|
| 2012/0236731 | A1* | 9/2012 | Beaudin .............. | H04W 72/082<br>370/248 |
| 2012/0281648 | A1 | 11/2012 | Dahrouj et al. | |
| 2013/0260817 | A1 | 10/2013 | Dahrouj et al. | |
| 2014/0126500 | A1 | 5/2014 | Tang et al. | |
| 2014/0126514 | A1 | 5/2014 | Tang et al. | |
| 2014/0148184 | A1 | 5/2014 | Dahrouj et al. | |
| 2015/0057004 | A1* | 2/2015 | Cheng ................. | H04W 52/262<br>455/446 |

* cited by examiner

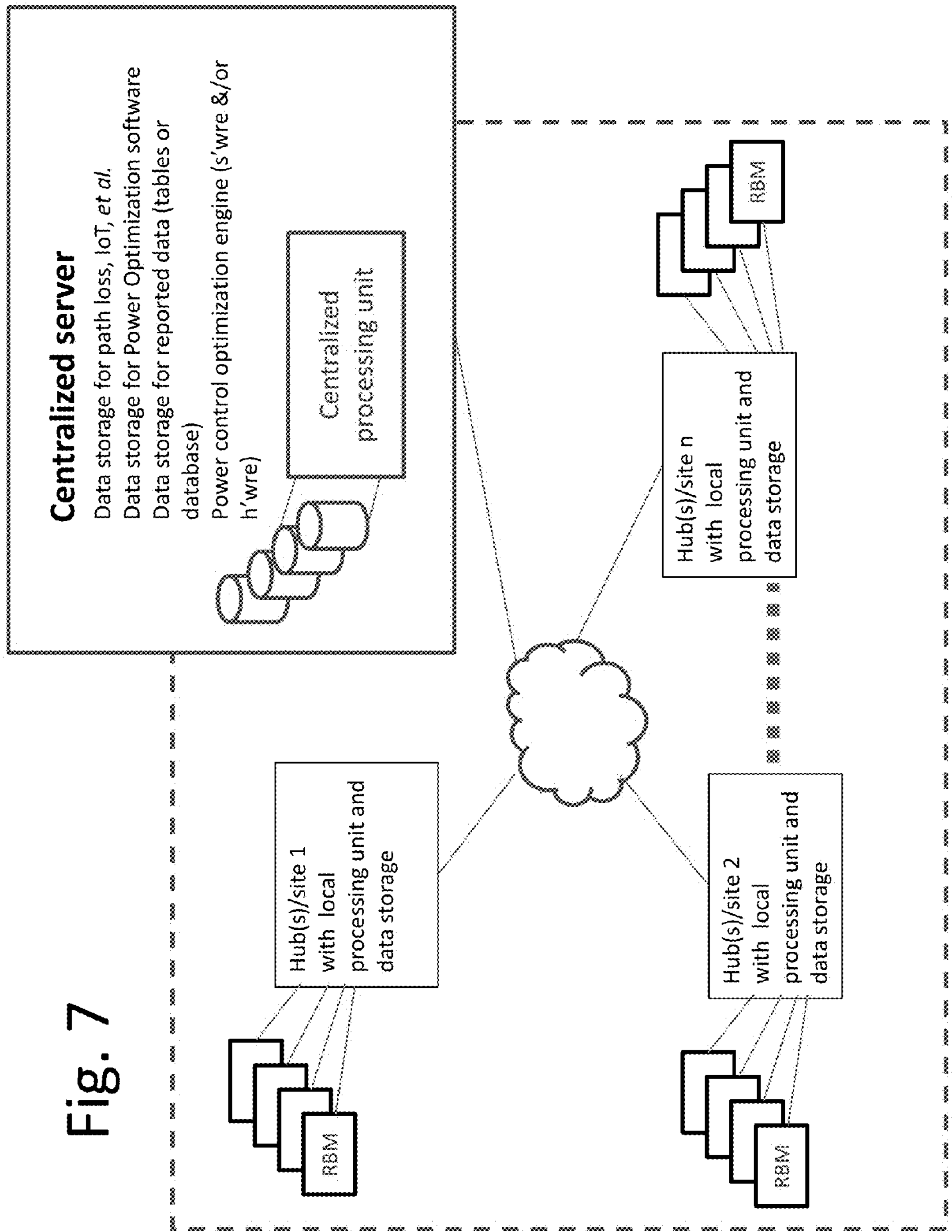
Fig. 7
Centralized server
Data storage for path loss, IoT, et al.
Data storage for Power Optimization software
Data storage for reported data (tables or database)
Power control optimization engine (s'wre &/or h'wre)
Centralized processing unit
Hub(s)/site 1 with local processing unit and data storage
Hub(s)/site 2 with local processing unit and data storage
Hub(s)/site n with local processing unit and data storage
RBM
RBM
RBM

SYSTEM AND METHOD FOR SELF-OPTIMIZED UPLINK POWER CONTROL IN A FIXED WIRELESS BACKHAUL NETWORK

CROSS-REFERENCE TO RELATED APPLICATIONS

This application claims priority from U.S. Provisional application No. 61/868,771, filed Aug. 22, 2013, entitled "System and Method for Self-Optimized Uplink Power Control in Wireless Backhaul Networks", which is incorporated by reference in its entirety.

This application is also related to International Patent Application No. PCT/CA2011/001020 and to U.S. patent application Ser. No. 13/230,368, both of which were filed Sep. 12, 2011, entitled "System and Method for Co-Channel Interference Measurement And Managed Adaptive Resource Allocation for Wireless Backhaul", claiming priority from U.S. Provisional patent application No. 61/382,217, filed Sep. 13, 2010; this application is also related to U.S. patent application Ser. No. 13/463,478, entitled "Interference Mitigation with Scheduling and Dynamic Power Spectrum Allocation for Wireless Networks", filed May 3, 2012 claiming priority from U.S. Provisional patent application No. 61/483,417, filed May 6, 2011 and No. 61/506,895, filed Jul. 12, 2011; all these applications are incorporated herein by reference in their entirety.

This application is related to U.S. Pat. No. 9,144,029 filed concurrently herewith, on Aug. 19, 2014, entitled "System and Method For Downlink Power Optimization in a Partitioned Wireless Backhaul Network with Out-Of-Neighborhood Utility Evaluation", which claims priority from U.S. Provisional application No. 61/868,787, filed Aug. 22, 2013, entitled "System and Method For Downlink Power Optimization with Out-Of-Neighborhood Utility Evaluation in Partitioned Wireless Backhual Networks" and which is incorporated herein by reference in its entirety.

TECHNICAL FIELD

The present invention relates generally to telecommunications service network technology, and particularly to a system and method for uplink power control in fixed wireless backhaul networks.

BACKGROUND

Wireless backhaul networks are deployed to carry the traffic between a wireless access network and the core network. For example, a wireless backhaul network may comprise a plurality of hubs, each connected to the wired core network, via Ethernet. Each hub serves multiple remote backhaul modules (RBMs), in a point to multipoint or point to point configuration, using a wireless channel. Each RBM is deployed close to an access network base station, such as a small cell base station, and connected to the base station via a cable. The hubs are deployed at the locations where wired high capacity access to the core network is available, e.g. at a fiber point-of-presence.

In a wireless backhaul network, the term cluster refers to a number of RBMs and their respective serving hub. Performance of an RBM, such as throughput, is contingent upon its received carrier-to-interference-plus-noise ratio (CINR) and the amount of bandwidth allocated to this RBM given a selected carrier. The received signal strength of an RBM is determined by the transmit power of its serving hub and the pathloss between the serving hub and the RBM.

The received interference-plus-noise level of an RBM is determined by the transmit powers of all the interfering hubs and the pathlosses between interfering hubs and the RBM. An RBM is affected by an interfering hub when a desired signal and an interfering signal are transmitted over the same carrier frequency.

In orthogonal frequency division multiple access (OFDMA) networks, the frequency resources are divided into subcarriers or tones. In frequency reuse of 1 multi-sector deployment, the interference-over-thermal noise (IoT) of each hub can vary greatly from one frame to another, due to different RBMs scheduled in transmission in different frames. Hence, effective uplink power control is necessary to mitigate the interference received at the hubs.

In the literature, many heuristic power control schemes have been proposed. Two commonly used power control schemes in uplink systems are Fractional Power Control (FPC) and Geometric power control (GPC). Reference is made to:

(1) Simonsson, A.; Furuskar, A., "Uplink Power Control in LTE—Overview and Performance: Principles and Benefits of Utilizing rather than Compensating for SINR Variations," Vehicular Technology Conference, 2008. VTC 2008—Fall. IEEE 68th, vol., No., pp. 1-5, 21-24 Sep. 2008, which describes a method using Fractional Power Control (FPC); and (2) Senarath, Gamini, et al., U.S. patent application Ser. No. 12/633,657, Senarath, Gamini, et al., entitled "System and Method for Power Control." which describes a method using Geometric Power Control (GPC).

As applied to a wireless backhaul network, for FPC, the transmit power of each RBM is given by $$P_{TX}^{FPC}=\max\{\min\{P^{max},P_0+\alpha PL_{serv}\},P^{min}\}$$

where $P_0$ is the target per-tone received signal strength, $\alpha$ is a pathloss compensation factor, $PL_{serv}$ is the pathloss between the RBM and its serving hub, $P^{min}$ is the minimum per-tone transmit power, $P^{max}$ is the maximum per-tone transmit power, and $P_{TX}^{FPC}$ is the per-tone transmit power governed by the FPC algorithm.

For GPC, the transmit power of each RBM is given by $$P_{TX}^{GPC}=\max\{\min\{P^{max},P_{TX}^{FPC}+\beta CINR_{DL}\},P^{min}\}$$

where $CINR_{DL}$ is the received CINR of the RBM in downlink from its serving hub (i.e., downlink geometry), $\beta$ is a tunable parameter, and $P_{TX}^{GPC}$ is the per-tone transmit power governed by the GPC algorithm.

Most of the existing power control schemes, including FPC and GPC, however, require a computationally expensive parameter search. For instance, there are 2 parameters in FPC and 3 parameters in GPC to optimize. More importantly, if there is any change in the radio frequency (RF) and/or interference environments, those parameters need to be optimized again, which might not be feasible, in practice.

An object of the present invention is to provide an improved or alternative method and system for uplink power control in wireless networks, particularly for wireless backhaul solutions comprising fixed or stationary nodes with directional antennas, including small cell non-line-of-sight (NLOS) wireless backhaul networks.

SUMMARY OF INVENTION

Aspects of the present invention provide a method and a system for uplink power control in a fixed wireless backhaul network wherein determining an uplink transmit power of each remote backhaul module (RBM) comprises obtaining an interference-over-thermal (IoT) noise value of each hub, determining a target IoT noise value for each RBM, determining a total pathloss from each RBM to its serving hub, determining a target uplink carrier to interference and noise ratio (CINR) for the RBM, and computing the RBM uplink transmit power for each RBM by summing the target interference-over-thermal (IoT) noise value for the RBM, the total pathloss of the RBM to its serving hub, and the target uplink CINR. Computationally expensive parameter sweeps are avoided. The method can be implemented using centralized processing or distributed processing.

One aspect of the invention provides a method of uplink power control in a fixed wireless backhaul network comprising a plurality of nodes, wherein each node comprises at least one hub module, and each hub module serves one or more remote backhaul modules (RBMs) through hub-RBM radio links, the method comprising performing, in one or more processing units of the network, the steps of:

in a parameter training phase:

determining an initial transmit power for each hub and for each RBM;

issuing commands to each hub comprising an initial transmit power for each hub;

issuing commands to each RBM comprising an initial transmit power for each RBM;

obtaining data comprising: a serving pathloss PL from each hub to each served RBM, a downlink CINR for each RBM, and IoT information for each hub;

reporting said data to a processing unit and storing said data in storage means of the processing unit;

determining from said data a target IoT for each RBM; and in a parameter application phase, computing from said data an uplink transmit power for each RBM, wherein the uplink transmit power $P_{TX}^{SON\text{-}PC}$ for each RBM is computed as:

$$P_{TX}^{SON\text{-}PC}=\max\{\min\{P^{max},CINR_{DL}+IoT_{,target}^{dB}+PL_{serv}\},P^{min}\}$$

where $IoT_{,target}^{dB}$ is the target IoT of the serving hub;

$CINR_{DL}$ is the downlink received CINR;

$PL_{serv}$ is the pathloss from the RBM to its serving hub;

$P^{min}$ is the minimum per-tone transmit power;

$P^{max}$ is the maximum per-tone transmit power;

and issuing a command comprising a respective uplink transmit power update to each RBM;

configuring each RBM to transmit at said respective uplink transmit power.

The data for computation of the transmit power of each RBM requires only the downlink received CINR (i.e., downlink geometry) of the RBM, the pathloss from the RBM to its serving hub, and the target IoT of its serving hub. The method uses a self-optimized uplink power control algorithm which eliminates computationally expensive parameter sweeps. Thus, the method is referred to herein as "Self-Optimized" Network-Power Control (SON-PC).

The method maybe implemented with centralized or distributed processing, and with measured or estimated data. Accordingly, the method comprises issuing of commands, i.e. signalling messages between one or more processing units and network nodes, for data collection and power command exchanges.

In an embodiment, the SON-PC method is coordinated by a centralized server, such as a MARA server which coordinates radio frequency environment characteristics (RFEC) measurements across the network and provides other network control functions, as described in the above referenced related applications. For example, obtaining data comprising: a serving path loss (PL) from each hub to each served RBM, a downlink CINR for each RBM, and IoT information for each hub; may comprise performing RFEC measurements to obtain said data.

In some embodiments, the target IoT value for each RBM is set as a minimum of the IoT values of all hubs. The target uplink CINR of the each RBM may be set equal to its measured or estimated downlink CINR. Alternatively, the target uplink CINR of the each RBM is set equal to its downlink CINR times a scaling factor. In some embodiments, the target IoT value of each hub may be estimated using a pre-deployment planning tool and an estimated pathloss of each RBM-to-hub link.

In an embodiment, determining the initial transmit power for each hub and for each RBM comprises retrieving stored data comprising an initial power for each hub and for each RBM resulting from a previous parameter training phase. Determining the initial transmit power for each hub and for each RBM may comprise retrieving stored data comprising an estimated initial power for each hub and for each RBM. The method may be applied iteratively through several cycles of parameter training and parameter application, until a desired or appropriate performance is attained.

In an embodiment, the method comprises determining the target estimated uplink CINR of an RBM, computing the interference-over-thermal noise (IoT) of the serving hub of an RBM, and computing the per-tone uplink transmit power of each RBM. In another embodiment, the method comprises collecting radio frequency environment-related parameters (RFEC measurements) at each network node, and computing the target IoT for each RBM based on the collected data. In another embodiment, the method comprises estimating the IoT of a hub using a pre-deployment planning tool, and determining and configuring the uplink transmit power of an RBM using the estimated IoT of its serving hub in a distributed manner. In one embodiment, each RBM computes its own uplink transmit power from measured or estimated data.

Another aspect of the present invention provides a system for uplink power control in a backhaul network comprising a plurality of nodes, wherein each node comprises at least one hub module, each hub module serving one or more Remote Backhaul Modules (RBMs) through hub-RBM radio links, the system comprising one or more processing units for coordinating uplink power control, wherein said one or more processing units are configured for implement the steps of:

obtaining for each hub an interference-over-thermal noise (IoT) value;

obtaining for each RBM a target uplink carrier-to-interference-plus-noise ratio (CINR) and a total path loss to its serving hub;

storing the obtained IoT values in data storage means associated with one or more of said processing units;

determining for each RBM a target IoT value;

for each RBM, computing a respective RBM uplink transmit power comprising summing the target IoT value for said RBM, the total path loss of said RBM to its serving hub, and the target uplink CINR for said RBM, and selecting said respective RBM uplink transmit power with constraints of a maximum power and a minimum power; and configuring each RBM to transmit at said respective uplink transmit power.

When the system comprises a centralized processing unit of a centralized control server, the centralized control server is configured for:

providing commands to each hub comprising a transmit power and commands to each RBM via its serving hub comprising a respective RBM uplink transmit power;

receiving and storing data reported by the hub, and by the RBM via their serving hub, said data comprising said IoT values for each hub, said total pathloss for hub-RBM links from each hub to each served RBM, and said target uplink CINR for each RBM;

determining from said data a target IoT for each RBM;

computing from said target IoT and said data, the respective RBM uplink transmit power for each RBM; and providing commands to each RBM, via its serving hub, comprising a respective RBM uplink transmit power.

When the system comprises a plurality of distributed processing units, said processing unit of each respective hub may be configured to perform the steps of:

providing commands to each served RBM comprising an initial RBM uplink transmit power;

receiving and storing data from each served RBM, said data comprising a measured total pathloss from the respective hub to each served RBM;

determining from said data a target IoT for each RBM;

computing from said target IoT and said data, the respective RBM uplink transmit power for each RBM; and issuing to each served RBM command comprising the respective RBM uplink transmit power.

When the system comprises a plurality of distributed processing units, a said processing unit of each respective hub may be configured to perform the steps of:

providing commands to each served RBM comprising an initial RBM uplink transmit power;

receiving and storing data from each served RBM, said data comprising a measured total pathloss from the respective hub to each served RBM;

determining from said data a target IoT for served RBM and reporting a respective target IoT to each served RBM; and wherein each RBM is configured for computing its own respective RBM uplink transmit power comprising summing the target IoT value for said RBM, the total path loss of said RBM to its serving hub, and the target uplink CINR for said RBM, selecting said respective RBM uplink transmit power with constraints of a maximum power and a minimum power; and configuring itself to transmit at said respective uplink transmit power.

In some embodiments, the hub processing units further perform measurements of performance metrics, communicate performance metrics and other data to the centralized server for storage and look-up and optionally share data directly with co-located hubs.

For example, the centralized server stores performance metrics for each hub-RBM radio link for look-up and coordinates obtaining performance metrics for each hub-RBM radio link, by performing RFEC measurements. The centralized server may coordinate obtaining performance metrics and computing RBM uplink transmit powers. The centralized server may, for example, be a MARA server that coordinates interference detection and sensing, as well as coordination and implementation of power control across the network.

Another aspect of the invention provides a centralized or distributed computer readable storage medium storing programming instructions for execution by one or more processing units of a fixed wireless backhaul network comprising a plurality of nodes, wherein each node comprises at least one hub module, and each hub module serves one or more remote backhaul modules (RBMs) through hub-RBM radio links, said programming instructions implementing the steps of:

obtaining for each hub an interference-over-thermal noise (IoT) value;

obtaining for each RBM a target uplink carrier-to-interference-plus-noise ratio (CINR) and a total path loss to its serving hub;

storing the obtained IoT values in data storage means associated with one or more of said processing units;

determining for each RBM a target IoT value;

for each RBM, determining a respective RBM uplink transmit power comprising summing the target IoT value for said RBM, the total path loss of said RBM to its serving hub, and the target uplink CINR for said RBM, and selecting said respective RBM uplink transmit power within constraints of a maximum power and a minimum power; and configuring each RBM to transmit at said respective uplink transmit power.

The foregoing, and other objects, features, aspects and advantages of the present invention will become more apparent from the following detailed description, taken in conjunction with the accompanying drawings of preferred embodiments of the invention, which description is by way of example only.

BRIEF DESCRIPTION OF DRAWINGS

FIG. 7 shows a block diagram which represents schematically elements of a system comprising a centralized control server for implementing self-optimized uplink power control in a wireless backhaul network.

DETAILED DESCRIPTION OF EXEMPLARY EMBODIMENTS

A system and method for uplink power control in a wireless backhaul network will be described, by way of example, with reference to a NLOS wireless backhaul network 100 as illustrated schematically in FIG. 1, which represents schematically the topology of a system comprising a point-to-multipoint wireless backhaul network, comprising a plurality of fixed nodes. The nodes comprise a plurality of hubs 102 and RBMs 104.

Figure 1:
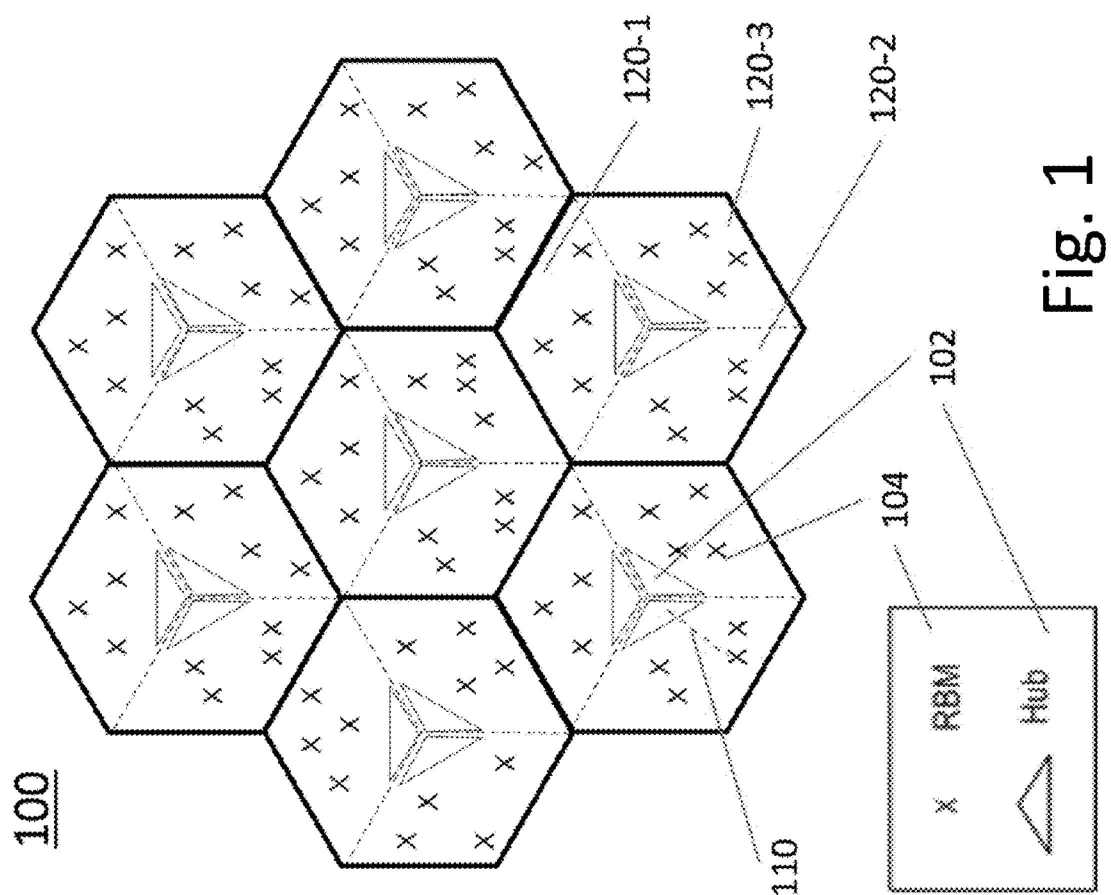
FIG. 1 shows a schematic diagram of a wireless backhaul network comprising a plurality of hubs, each hub serving a plurality of Remote Backhaul Modules (RBMs) for implementing a method of uplink power control in a wireless backhaul network according to an embodiment of the present invention.

As an example only, the wireless backhaul network 100 shown in FIG. 1 comprises a plurality of seven sites or cells, each site comprising three hub modules 102, with each hub module serving a sector 120 comprising a cluster of a plurality of Remote Backhaul Modules (RBMs) 104. Thus, there are 21 sectors, each with a hub module 102, serving a cluster of up to four RBMs. As shown, three hubs modules 102, each with directional antenna, are co-located in each of the cell centers, with a cluster of RBMs mapped to each respective serving hub, in each of the three sectors 120-1, 120-2, and 120-3 of the cell.

Figure 2:
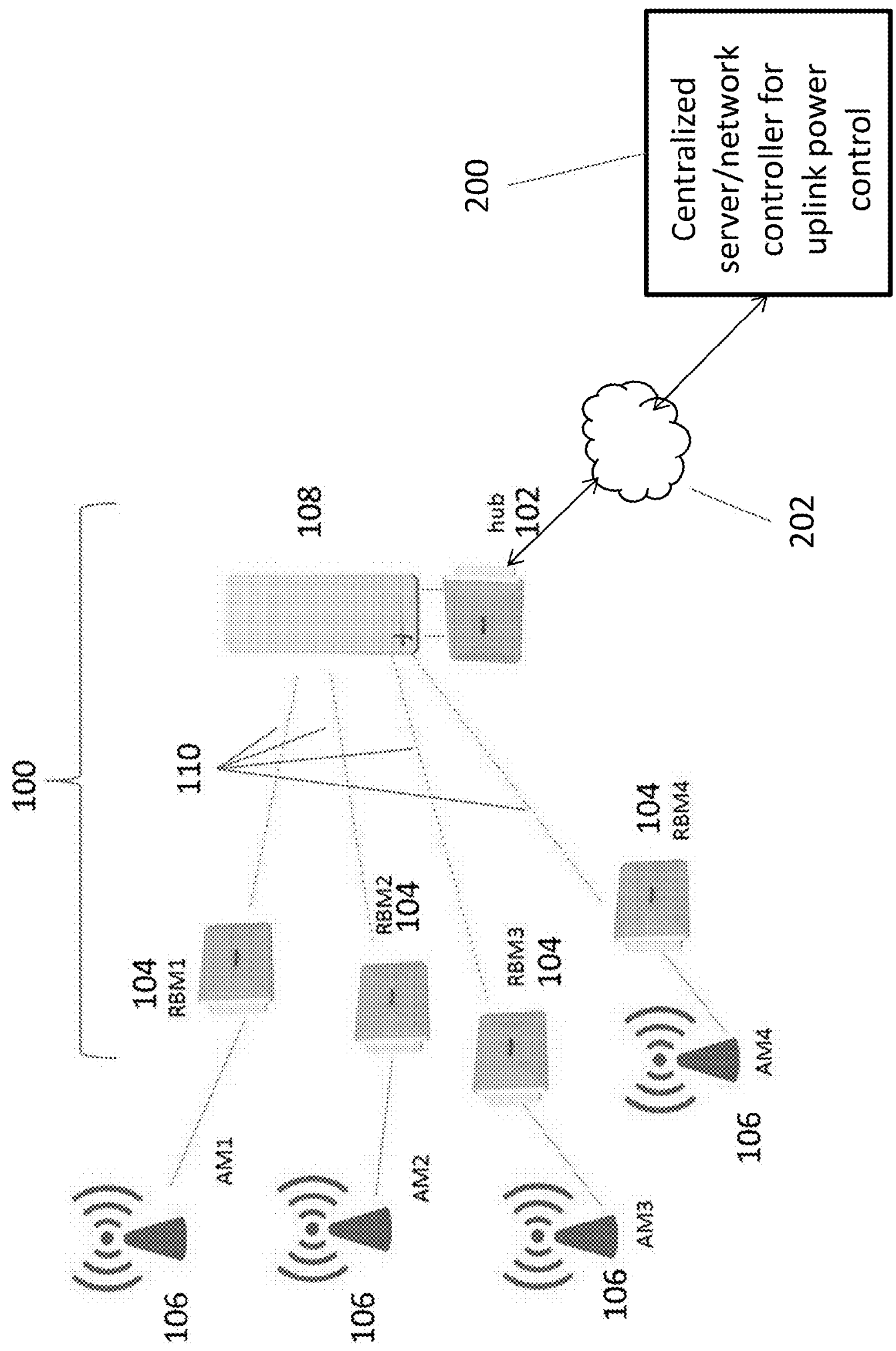
FIG. 2 shows a schematic diagram of part of the wireless backhaul network comprising one cluster of four RBMs served by a hub module, each RBM being connected to an access module of an access network, and wherein the hub has a connection to a centralized control server for coordinating uplink power control in the wireless backhaul network.

In each sector 120, a hub 102 serves its set or cluster of Remote Backhaul Modules (RBMs) 104 through wireless links, i.e. hub-RBM radio links 110, as shown schematically in FIG. 2. Each RBM 104 communicates with and is co-located with an access module (AM) 108 of an access network, such as a small cell-base station, using a wired connection, e.g. an Ethernet cable. The hub module 102 may have a multi-beam antenna 108 and RBMs 104 each have an integrated directional antenna that is directed towards the hub. Unlike a multi-hop architecture, each link 110 comprises only one hop from each RBM 104 to a respective hub to carry the traffic. It is also different from the relay system where the access links and relay links share the same radio frequency band. The backhaul network operates at a different frequency band from that of the access network. Also shown in FIG. 2 is a communications link 202 from the hub 102 to a centralized server or controller 200, for managing control functions of the wireless backhaul network.

In wireless NLOS backhaul networks, the goal of uplink power control is to optimize the system performance such as network capacity and coverage by setting a proper transmit power level for each RBM. The performance of an RBM is generally governed by its achievable throughput, which is a function of the amount of allocated bandwidth and its spectral efficiency. The spectral efficiency (SE) is a function of carrier-to-interference-plus-noise ratio (CINR), for instance $SE=\log_2(1+CINR)$, where CINR depends on the strength of a desired signal and the strength of the aggregate interference plus background noise. The method of self-optimized power control disclosed herein seeks to enhance the uplink CINR for every RBM in the network by a method that avoids a computationally expensive parameter sweep.

Figure 3:
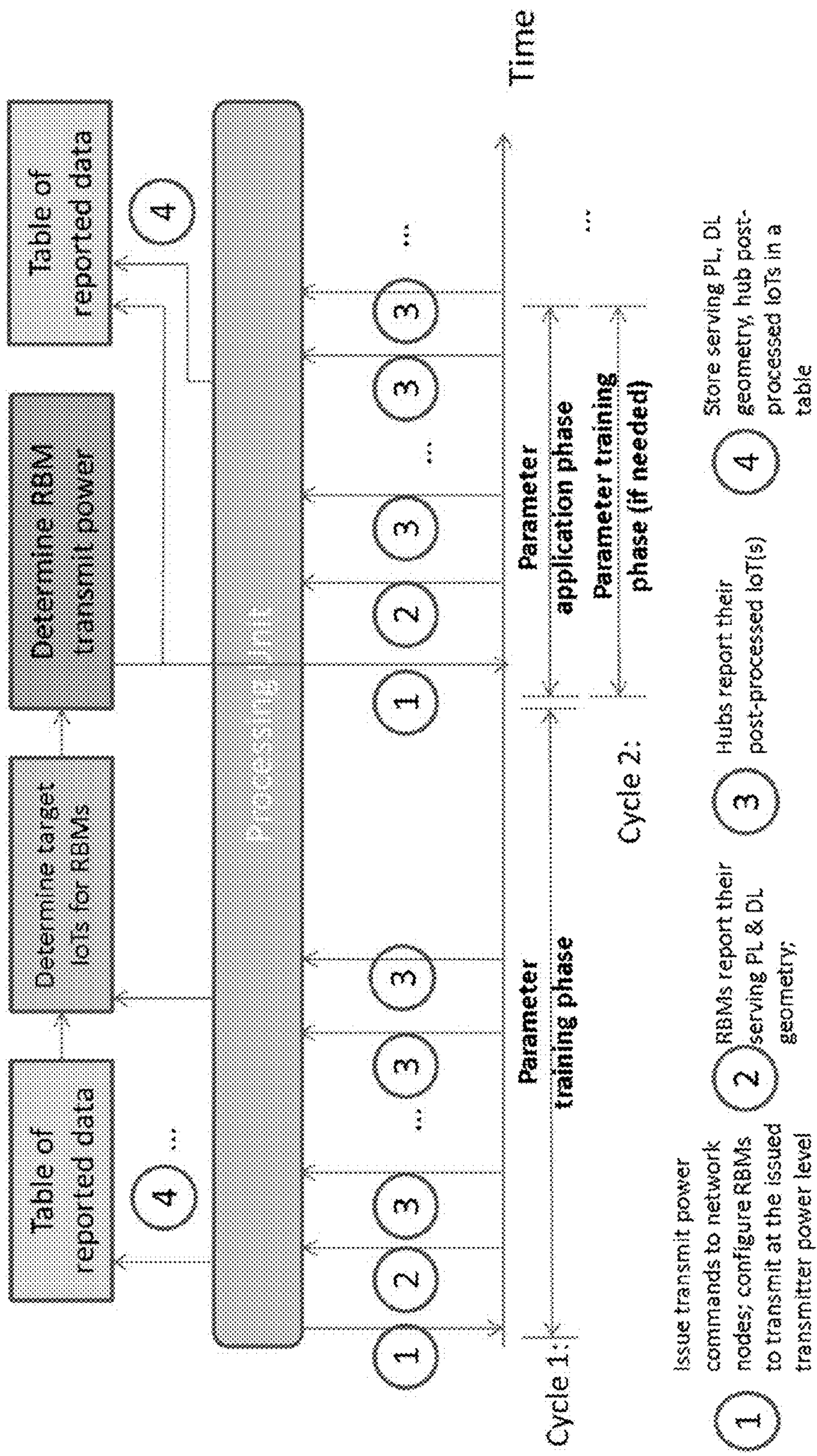
FIG. 3 illustrates schematically a timing diagram for the system and method of self-optimized uplink power control, showing message exchanges between RBMs, hubs and a centralized processing unit.

FIG. 3 shows schematically a timing diagram for implementing an embodiment of a system and method of self-optimized uplink power control according to embodiments of the invention. In summary, time is divided into cycles, comprising a parameter training phase (cycle 1) and a parameter application phase (cycle 2). In the parameter training phase, a processing unit, e.g. a centralized processing unit, issues commands to all hubs comprising an initial transmit power and issues commands to each RBM via their serving hub comprising an initial transmit power. Measured or estimated data are obtained for data comprising: serving pathloss PL from each hub to RBM; downlink CINR (i.e. downlink geometry) for each RBM; and IoT information for each hub. These data are reported to the processing unit, and reported data is stored, e.g. in a table or database. The reported data are used to determine a target IoT for each RBM. In the parameter application phase, the processing unit computes the uplink transmit power of each RBM according to the SON-PC algorithm as described in more detail below, and issues a transmit power update command to each RBM via their serving hub. The process may be repeated through several parameter training and parameter application cycles until an acceptable or target performance is attained. The process may be repeated at periodic intervals and/or if there is any change in the radio frequency (RF) and/or interference environment.

In some embodiments, the method of power control is implemented in a system using a centralized server with a processing unit for coordinating power control, across the network. The centralized server may provide other network control functions. FIG. 7 shows a block diagram which represents schematically elements of a system comprising a centralized control server for implementing self-optimized uplink power control in a wireless backhaul network. Alternatively, in some embodiments, processing may be distributed amongst the nodes, e.g. implemented in a system using distributed processing units at each hub. The following embodiments are described by way of example to illustrate examples with centralized and distributed processing.

In a first embodiment of a method for self-optimized uplink power control, the method is implemented through a centralized processing unit, e.g. in a centralized server that provides control functions for the wireless backhaul network and coordinates power control, such as illustrated in FIG. 7.

For some embodiments, the following parameters are referred to in the description and equations below:

Per-tone transmit power (linear) of hub i: $P_i^{hub}$

Per-tone transmit power (linear) of RBM j in hub i: $P_{j\in hub(i)}^{RBM}$, where hub(i) is a set of RBMs served by hub i Pathloss (dB) from hub i to RBM j: $PL_{ij}$ Channel gain (linear) from hub i to RBM j:

$$g_{ij} = 10^{\wedge}\left(-\frac{PL_{ij}}{10}\right)$$

Downlink CINR (dB) of RBM j from hub i:

$$CINR_{ij}^{DL} = 10\log_{10}\left(\frac{p_i^{hub} g_{ij}}{\sum_{k\neq i} p_k^{hub} g_{kj} + n}\right),$$

where n is the background noise

Uplink CINR (dB) of RBM j at hub i:

$$CINR_{ij}^{DL} = 10\log_{10}\left(\frac{p_{j\in hub(i)}^{RBM} g_{ij}}{\sum_{k\neq i} p_{l\in hub(k)}^{RBM} g_{il} + n}\right),$$

where RBM j at hub i and RBM 1 at hub k are scheduled in the same resource slot.

The parameter training phase comprises: determining an initial transmit power $P_0^{hub}$ for each of the hubs; and determining an initial transmit power $P_0^{RBM}$ each the RBMs in the network. For example, in one implementation, all hubs transmit at the same initial transmit power. $P_0^{hub}$ and $P_0^{RBM}$ may, for example, be set at a maximum power $P^{max}$, or at a predetermined training power value $P^{training}$, or at power levels stored from a previous parameter training cycle. All hubs transmit at $P_0^{hub}$ and each RBM measures its received downlink CINR from its serving hub (i.e., downlink geometry) and reports to the processing unit for storage in a table of reported data. All RBMs transmit at $P_0^{RBM}$, and each hub measures its IoT and reports to the processing unit for storage in a table of reported data.

The reported data is used by the processing unit to determine a target IoT for each RBM. This step comprises determining the target IoT for each hub, and reporting the target IoT to its serving RBMs.

Each RBM then computes a per-tone transmit power $P_{TX}^{SON\text{-}PC}$ based on the SON-PC algorithm defined by the following equation:

$$P_{TX}^{SON\text{-}PC}=\max\{\min\{P^{max},CINR_{DL}+IoT_{target}^{dB}+PL_{serv}\}),P^{min}\}$$

where $CINR_{DL}$ is the received CINR of the RBM in downlink from its serving hub, $IoT_{target}^{dB}$ is the target IoT (interference-over-thermal noise) in dB at the serving hub, $PL_{serv}$ is the serving pathloss from the serving hub, $P^{min}$ is the minimum per-tone transmit power, $P^{max}$ is the maximum per-tone transmit power.

The serving pathloss $PL_{serv}$ for each hub-RBM link can be obtained by the method disclosed in the above referenced related U.S. patent application Ser. No. 13/230,368, and PCT International patent application No. PCT/CA2011/001020, both filed Sep. 12, 2011 entitled "System and Method for Co-Channel Interference Measurement sand Managed Adaptive Resource Allocation for Wireless Backhaul". This application describes the use of a centralized processing unit or server (referred to as a MARA server) for measurement of Radio Frequency Environment Characteristics (RFEC measurements) comprising interlink interference for each hub-RBM radio link. Measured data for each hub-RBM link is stored in a table or matrix, referred to as an MARA Matrix or RFEC table.

In a method according to a second embodiment, processing may be distributed amongst the nodes, i.e. performed by processing units of each hub. In the case where distributed processing is applied, each hub monitors its IoT and determines the target IoT for each of its serving RBMs, and reports to each RBM. Computation of the uplink transmit power of each RBM is the same as that in the case of centralized processing:

$$P_{TX}^{SON\text{-}PC}=\max\{\min\{P^{max},CINR_{DL}+IoT_{target}^{dB}+PL_{serv}\},P^{min}\}.$$

Referring again to FIG. 3, in the parameter training phase, both hubs and RBMs use an initial transmit power for transmission, and the measurements such as serving pathloss, downlink CINR, and IoT information are reported to the hub processing unit. The hub processing unit then determines the target IoT for each RBM. In the parameter application phase, the hub processing unit computes the uplink transmit power of each RBM and issues a transmit power update command to each RBMs. The process can be repeated as necessary.

Where there is no coordination amongst hubs, for operation with a required Modulation and Coding Scheme (MCS), each hub, at time t, needs to predict the IoT at time t+x for RBM transmissions at t+x, where x>0.

In a method of one embodiment, IoT values are predicted using a time sliding window, for instance, for hub i, the IoT can be estimated using:

$$IoT_i^{linear}(t)=a\left(\frac{\sum_{k\neq i}P_{l\in hub(k)}^{RBM}g_{il}}{n}\right)+(1-a)IoT_i^{linear}(t-1)$$

where $0\leq a\leq 1$ and $IoT_i^{dB}(t)=10\log_{10}(IoT_i^{linear}(t))$.

In a method of another embodiment, the estimated IoT includes a system phase noise:

$$IoT_i^{linear}(t)=a\left(\frac{\sum_{k\neq i}P_{l\in hub(k)}^{RBM}g_{il}+\mu}{n}\right)+(1-a)IoT_i^{linear}(t-1)$$

where μ is the system phase noise.

The predicted uplink CINR in dB of RBM j at hub i can be computed as $$\widetilde{CINR}_{ij}^{UL}=10\log_{10}\left(\frac{P_{j\in hub(i)}^{RBM}g_{ij}}{(IoT_i^{linear}+1)n}\right)$$

where $P_{j\epsilon hub(i)}^{RBM}$ is per-tone transmit power (linear) of RBM j in hub i with hub(i) being a set of RBMs served by hub i, $$g_{ij}=10\wedge\left(-\frac{PL_{ij}}{10}\right)$$

is the channel gain (linear) from hub i to RBM j, $PL_{ij}$ is the pathloss [dB] from hub i to RBM j, and n is the background noise power.

The modulation and coding scheme (MCS) for the uplink transmission is selected based on this $\widetilde{CINR}_{ij}^{UL}$ value. The transmit power is determined by setting the estimated $\widetilde{CINR}_{ij}^{UL}$ to be the same as the downlink CINR observed by the RBM. The downlink CINR (dB) of RBM j from hub i is given by:

$$CINR_{ij}^{DL}=10\log_{10}\left(\frac{P_i^{hub}g_{ij}}{\sum_{k\neq i}P_k^{hub}g_{kj}+n}\right)$$

where $P_i^{hub}$ is the per-tone transmit power (linear) of hub i.

Given the serving pathloss from its serving hub, the target IoT at its serving hub and its target estimated uplink CINR, we can compute $P_{j\epsilon hub(i)}^{RBM}$ as follows: $P_{j\epsilon hub(i)}^{RBM}=\max\{\min\{\gamma_{ij}CINR_{ij}^{DL}+IoT_i^{dB}+PL_{ij},P^{max}\},P^{min}\}$, where $\gamma_{ij}$ can be viewed as the priority of RBM j in hub i, which is a system design-dependent parameter. This priority variable $\gamma_{ij}$ is set by a system operator, to determine how t the uplink (UL) CINR of each RBM should deviate from its downlink (DL) CINR. Each RBM receives a command comprising its respective uplink transmit power $P_{j\epsilon hub(i)}^{RBM}$, and is configured to transmit accordingly at its respective uplink transmit power.

In a method according to another embodiment, in the parameter training phase, all hubs transmit at $P_0^{hub}$ and each RBM measures its received downlink CINR from its serving hub and reports the downlink CINR along with its serving pathloss to a processing unit. All RBMs transmit at $P_0^{RBM}$ and each hub measures its IoT over time, for instance, $$S_{IoT_i}^{linear}=\{IoT_i^{linear}(t_1),IoT_i^{linear}(t_2),\ldots IoT_i^{linear}(t_T)\}$$

where $S_{IOT_i^{linear}}$ is a set of IoTs values observed by hub i in time. The step of IoT reporting may comprise:

1) each hub obtains a desired post-processed IoT value by the end of the training phase $IoT_i^{linear}=f(S_{IoT_i^{linear}})$, e.g. determines a minimum, mean or maximum IoT, and reports this post-processed IoT to the processing unit; or
2) each hub reports a set of IoT vales to the processing unit, and the processing unit then determines a desired post-processed IoT for each hub.

Tables 1 and 2 below illustrate an example table of data reported by RBMs, and an example table of data reported by hubs, respectively. In the parameter application phase, the processing unit determines the target IoT value for each RBM at its serving hub based on the reported IoT data from the hubs in the backhaul network. For instance, $IoT_{i,target}^{dB}=\min_k\{IoT_k^{dB}\}$, meaning that the processing unit determines the target IoT for all RBMs using the minimum reported IoT.

TABLE 1

Example table of serving pathloss and downlink CINR reported by RBMs

| Reported Data | RBM 1 | RBM 2 | ... | RBM J |
|---|---|---|---|---|
| Serving Pathloss (dB) | 100 | 120 | ... | 82 |
| DL CINR (dB) | 21 | 5 | ... | 31 |

TABLE 2

Example table of desired IoTs reported by hubs

| Reported Data | Hub 1 | Hub 2 | ... | Hub I |
|---|---|---|---|---|
| Desired post-processed IoT (dB) | 10 | 15 | ... | 30 |

Table 3 below illustrates an example table of data required to compute the uplink transmit power of each RBM. The target IoT for each RBM is determined by the processing unit based on the IoT information sent by the hubs in the network. A power change command is issued to each hub to inform its serving RBMs of an uplink transmit power update.

TABLE 3

Example table of data required to compute the uplink transmit power of each RBM

| | RBM 1 | RBM 2 | ... | RBM J |
|---|---|---|---|---|
| Serving Pathloss (dB) | 100 | 120 | ... | 82 |
| DL CINR (dB) | 21 | 5 | ... | 31 |
| Target IoT (dB) | 12 | 12 | ... | 14 |

In yet another embodiment, the method of self-optimized uplink power control does not require centralized processing for computing the transmit power of each RBM. Instead, a pre-deployment planning tool is used to locate RBMs and hubs, and the IoT of each hub is estimated based on the estimated pathloss of the RBM-to-hub links. The estimated uplink CINR is set to be the same as the downlink CINR observed by the RBM (i.e. an estimated or measured downlink CINR). Together with the serving pathloss, a processing unit of each RBM can compute its own uplink transmit power as follows:

$$P_{j\in hub(i)}^{RBM}=\max\{\min\{\gamma ij CINR_{ij}^{DL}+\widetilde{IoT}_i^{dB}+PL_{ij},P^{max}\},P^{min}\}$$

where $\widetilde{IoT}_i^{dB}$ is the estimated target IoT of its serving hub determined by the pre-deployment planning tool.

Although several embodiments have been described by way of example, it will be apparent that the SON-PC method has flexibility to be implemented using centralized and/or distributed processing, and based on measured and/or estimated data. When using a centralized server and processing unit, such as a MARA server providing other network control functions, the SON-PC method may be implemented using available RFEC measurements for serving pathloss $PL_{serv}$ for each hub-RBM link. Alternatively, for distributed implementation required data, including the target IoT value of each hub and an estimated pathloss of each RBM-hub link, may be obtained using pre-deployment network planning tools. In the latter example, each RBM may compute its own uplink transmit power. In other embodiments, processing may be distributed amongst a centralized processing unit and processing units of network nodes.

Simulation Results for Performance Comparison.

Simulations were carried out using the following system level assumptions for a network similar to that illustrated in FIG. 1, and the following parameters listed in Table 4.

TABLE 4

| |
|---|
| ISD: 800 m |
| Deployment use case: 21 hubs |
| Dropping: random 4 RBMs per hub |
| Hub association/clustering: geographic |
| Objective function: weighted PF |
| Antenna patterns: MTI |
| Hub height: 45 m |
| RBM height: 5 m |
| RBM tilt options: serving hub pointing |
| Thermal noise: −174 dBm |
| Channel model: SUI-3 |
| Bandwidth: 10 MHz |
| UL Pmax: 27 dBm |
| UL Pmin: −22 dBm |
| 1 power zone |
| PHY abstraction: 2x2 MIMO with efficiency 81/140 |
| Number of random UL scheduling instances for IoT samples: 200 |
| Variables for FPC & GPC: Vary $P_0$, α, β and pick the best combination |

Figure 4:
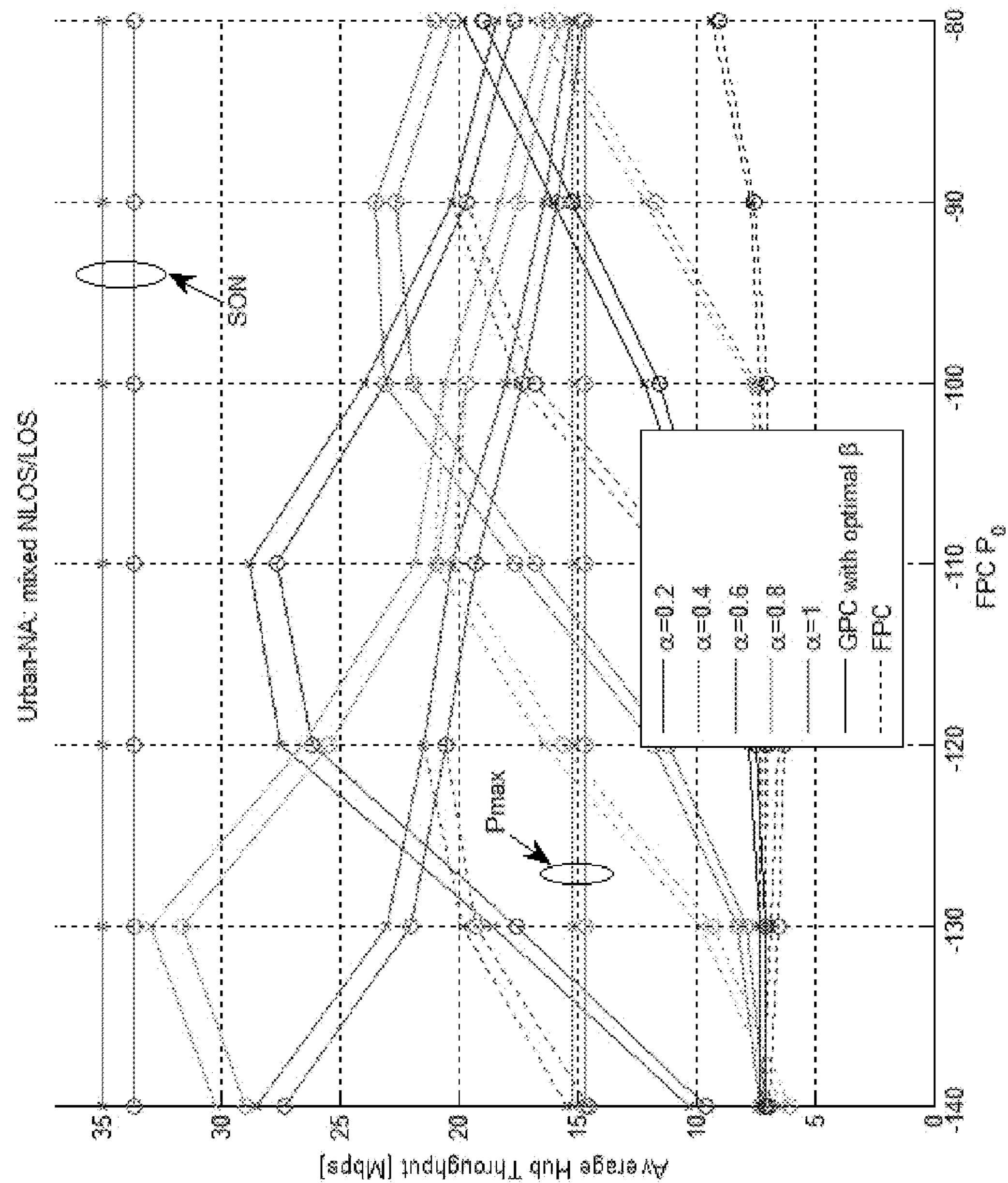
FIG. 4 shows a graph to illustrate network simulation results for network average hub throughput performance as a function of the target per-tone received signal strength $P_0$, for different uplink power control schemes, namely SON-PC, $P_{max}$ (where each node transmits at maximum power), GPC with optimal $\beta$ and different $\alpha$ values, and FPC with different $\alpha$ values.

FIG. 4 shows a graph to illustrate network simulation results for network average hub throughput performance as a function of the target per-tone received signal strength $P_0$, for different uplink power control schemes, namely for SON-PC, $P_{max}$ (i.e., where each node transmits at maximum power), GPC with optimal β and different α values, and FPC with different α values. The y-axis shows the average hub throughput in Mb/s, while the x-axis shows the value of $P_0$ in dB. For each method, results are shown for two hub beam configuration options: fixed downtilt and per-cluster downtilt. The fixed downtilt option refers to the situation where each hub adjusts its antenna elevation angle to point to the edge of its coverage area, while the per-cluster tilt option refers to the situation where each hub adjusts its antenna elevation angle to point to the geographical center of the locations of its serving RBMs. The simulation results show that the SON-PC method achieves the best average hub throughput performance compared to its counterparts. GPC performs almost as well as SON-PC, but requires an optimal search of 3 parameters and is thus computationally more complex.

Figure 5:
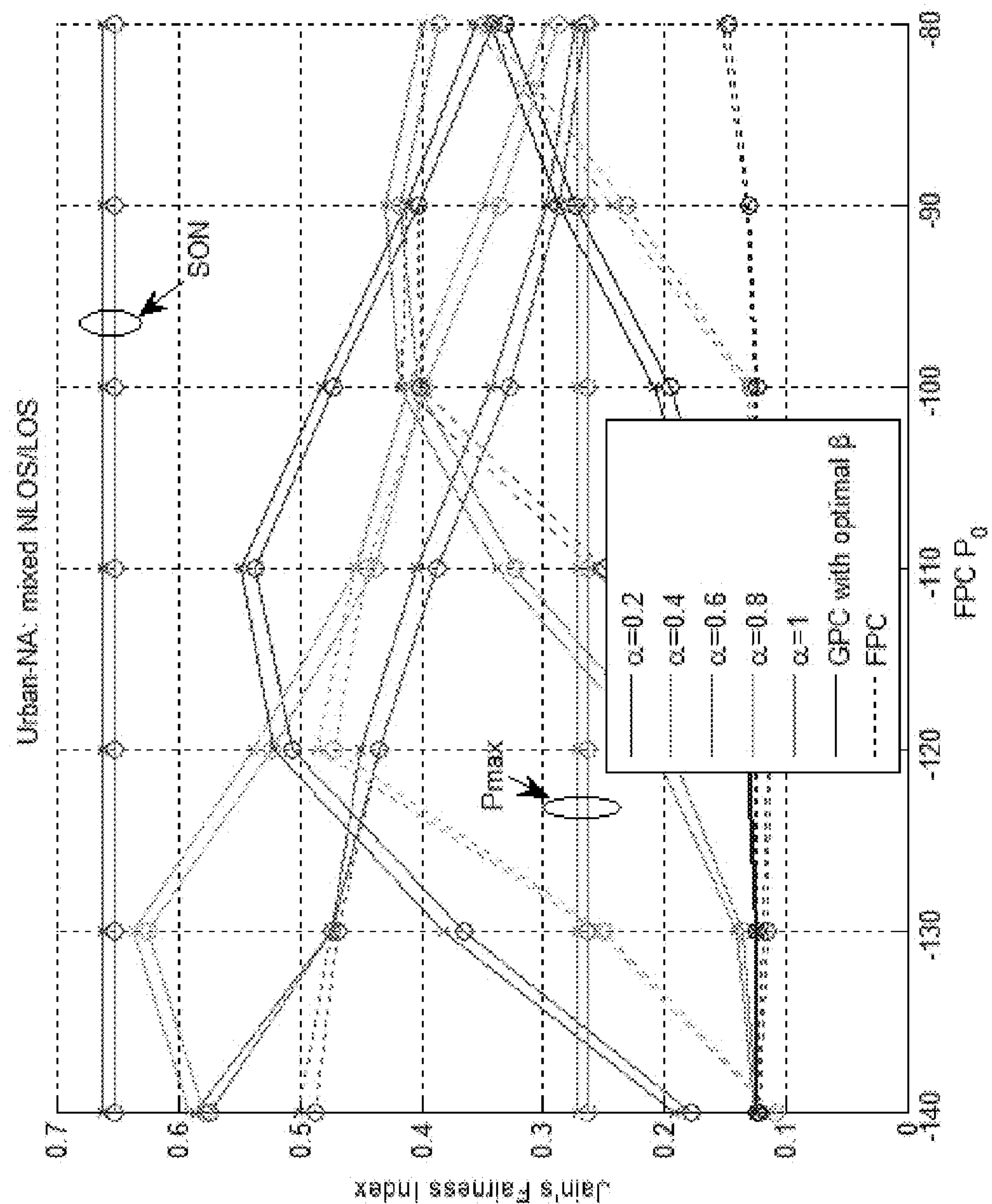
FIG. 5 shows a graph to illustrate network simulation results for a fairness index as a function of the target per-tone received signal strength $P_0$, for different uplink power control schemes, namely SON-PC, $P_{max}$, GPC with optimal $\beta$ and different $\alpha$ values, and FPC with different $\alpha$ values.

FIG. 5 shows a graph to illustrate network simulation results for a fairness index as a function of the target per-tone received signal strength $P_0$, for different uplink power control schemes, namely SON-PC, $P_{max}$, GPC with optimal β and different α values, and FPC with different α values. The fairness performance is characterized by using the Jain's fairness index:

$$FI = \frac{\left(\sum_{i=1}^{m} x_i\right)^2}{m\left(\sum_{i=1}^{m} x_i^2\right)},$$

where $x_i$ is the throughput of RBM i, and m is the number of RBMs in the wireless backhaul network. The y-axis shows the fairness performance, while the x-axis shows the value of $P_0$ in dB. The simulation results show that the SON-PC method achieves the best fairness performance compared to its counterparts.

Figure 6:
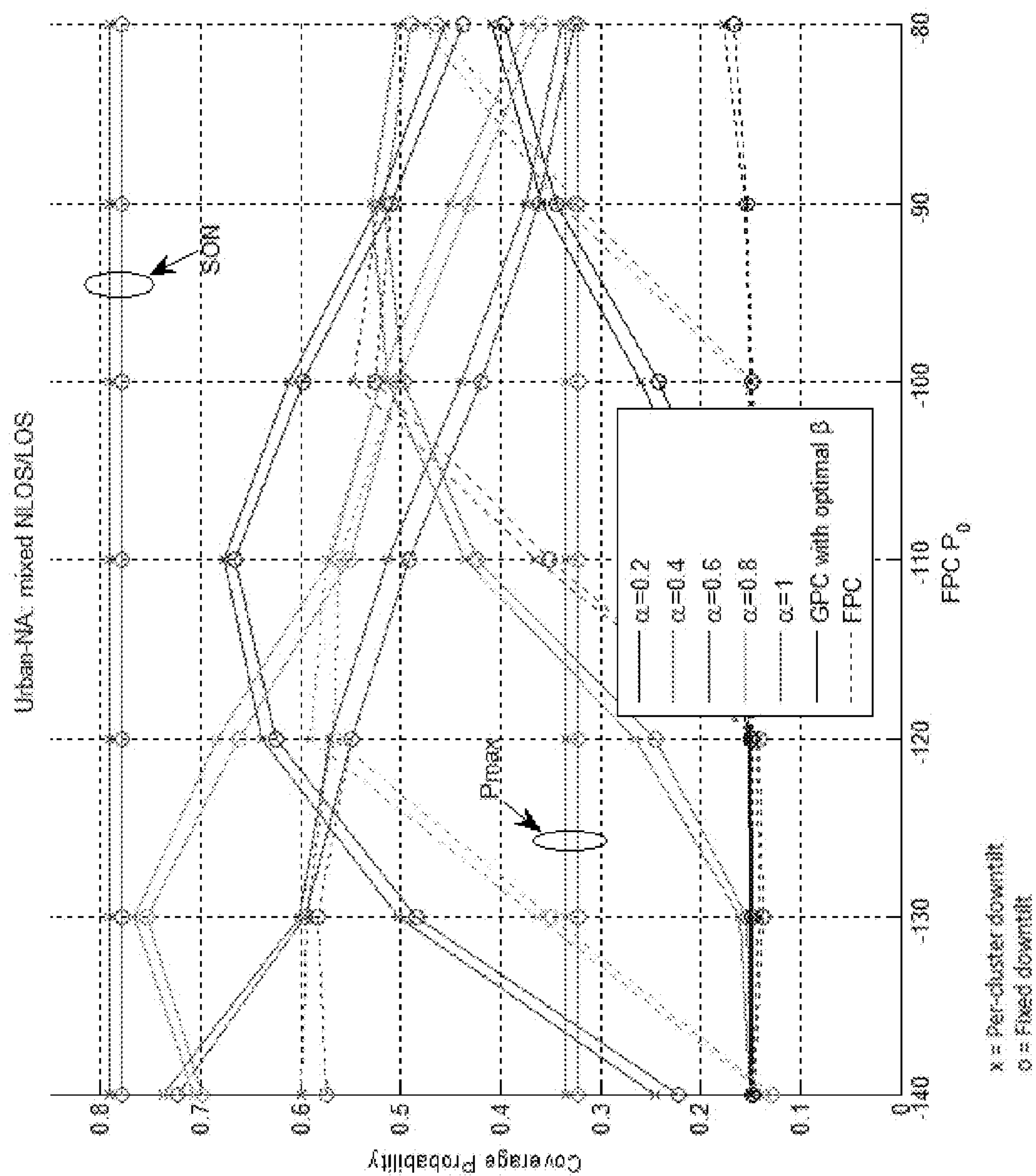
FIG. 6 shows a graph to illustrate network simulation results for a network coverage probability as a function of the target per-tone received signal strength $P_0$, for different uplink power control schemes, namely SON-PC, $P_{max}$, GPC with optimal $\beta$ and different $\alpha$ values, and FPC with different $\alpha$ values.

FIG. 6 shows a graph to illustrate network simulation results for a network coverage probability as a function of the target per-tone received signal strength $P_0$, for different uplink power control schemes, namely SON-PC, $P_{max}$ GPC with optimal β and different α values, and FPC with different α values. The coverage performance is characterized by this equation:

$$\text{Coverage Probability} = \frac{I(x_i)}{m},$$

where $x_i$ is the throughput of RBM i, $$I(x_i) = \begin{cases} 1, & x_i > 0 \\ 0, & x_i = 0 \end{cases}$$

and m is the number of RBMs in the wireless backhaul network. The y-axis shows the coverage performance, while the x-axis shows the value of $P_0$ in dB. The simulation results show that the SON-PC method achieves the best network coverage performance compared to its counterparts.

Table 5 below summarizes the relative gains of SON-PC over other power control schemes depicted in FIGS. 3, 4 and 5.

TABLE 5

Performance gains of SON-PC compared to other power control schemes

| | % Gain of SON-PC Compared to Different Power Control Methods | | | | | |
|---|---|---|---|---|---|---|
| | Fixed Downtilt | | | Per-Cluster Downtilt | | |
| Performance Metric | Pmax | FPC | GPC | Pmax | FPC | GPC |
| Avg HM Throughput (Mbps) | 129.4% | 74.8% | 6.5% | 130.3% | 76.2% | 6.1% |
| Avg RBM Fairness | 149.0% | 39.6% | 4.6% | 145.0% | 39.8% | 4.1% |
| Coverage Availability | 141.1% | 33.7% | 3.5% | 135.7% | 33.3% | 3.1% |

As mentioned above, FIG. 7 represents schematically elements of a system in a wireless backhaul network comprising a centralized control server having a processing unit for implementing a method of uplink power control according to an embodiment of the present invention. The centralized server may provide other control functions for the wireless backhaul network and may, for example, function as a MARA server for performing RFEC measurements for the network. For performing a method of uplink power control according to an embodiment of the present invention, as illustrated schematically, the centralized server comprises a processing unit and data storage means, e.g. data storage for storing tables of reported data, and computer readable media storing programming instructions or software for implementing method steps comprising: including receiving and storing reported data, determining target IoTs for RBMs, and determining the RBM transmit power, storing and updating tables of reported data. The system provides suitable communications interfaces and links between the centralized server and the hubs for sending and receiving control messages and data for implementing power control, e.g. control messages or signalling, comprising commands to the hubs, and commands to the RBMs via their respective serving hubs, to set initial uplink transmit power and to provide uplink transmit power updates or change commands.

While processing may be performed or coordinated by a centralized server as illustrated schematically in FIG. 7, it will be appreciated that, as mentioned above, in some embodiments, processing for uplink power control may be distributed amongst network nodes. For example, hubs may determine target IoTs for served RBMs, and RBMs may then determine their own target transmit power from received data. Optionally, measurements and computed data may be reported from the RBMs, via their hubs to a centralized server or processing unit.

For implementation of the disclosed method of uplink power control in a wireless backhaul network that is partitioned into a plurality of neighborhoods, it is feasible to coordinate the nodes within a neighborhood only. Where each neighborhood needs to consider the impact of its change on other neighborhoods, the algorithm applied to a neighborhood needs to consider both the in-neighborhood utility and out-of-neighborhood utility. For example, out-of-neighborhood utilities may be considered using an approach similar to that described with respect to the method for downlink power control disclosed in the above reference related U.S. patent application Ser. No. 14/462,912, filed concurrently herewith on Aug. 19,2014.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method of uplink power control in a fixed wireless backhaul network comprising a plurality of nodes, wherein each node comprises at least one hub module, and each hub module serves one or more remote backhaul modules (RBMs) through hub-RBM radio links, the method comprising performing, in one or more processing units of the network, the steps of:

in a parameter training phase:

determining an initial transmit power for each hub and for each RBM;

issuing commands to each hub comprising an initial transmit power for each hub;

issuing commands to each RBM comprising an initial transmit power for each RBM;

obtaining data comprising: a serving path loss (PL) from each hub to each served RBM, a downlink (DL) carrier to interference noise ratio (CINR) for each RBM, and interference-over-thermal (IoT) noise value for each hub;

reporting said data to a processing unit and storing said data in storage means accessible to the processing unit;

determining from said data a target IoT for each RBM; and in a parameter application phase:

computing from said data an uplink transmit power for each RBM, wherein the uplink transmit power $P_{TX}^{SON\text{-}PC}$ for each RBM is computed as:

$$P_{TX}^{SON\text{-}PC}=\max\{\min\{P^{max}, CINR_{DL}+IoT_{,target}^{dB}+PL_{serv}\}, P^{min}\}$$

where $IoT_{,target}^{dB}$ is the target IoT of the serving hub;

$CINR_{DL}$ is the downlink received CINR;

$PL_{serv}$ is the pathloss from the RBM to its serving hub;

$P^{min}$ is the minimum per-tone transmit power;

$p^{max}$ is the maximum per-tone transmit power; and issuing a command comprising a respective uplink transmit power update to each RBM;

configuring each RBM to transmit at said respective uplink transmit power.

2. The method of claim 1, wherein obtaining data comprising a serving pathloss PL from each hub to each served RBM, a downlink CINR for each RBM, and IoT information for each hub comprises performing radio frequency environment characteristics (RFEC) measurements to obtain said data.

3. The method of claim 1, wherein the target IoT value for each RBM is set as a minimum of the IoT values of all hubs.

4. The method of claim 1, wherein the target uplink CINR of the each RBM is set equal to its measured downlink CINR.

5. The method of claim 1, wherein the target uplink CINR of the each RBM is set equal to its downlink CINR times a scaling factor.

6. The method of claim 1, wherein the target IoT value of each hub is estimated using a pre-deployment planning tool and an estimated pathloss of each RBM-to-hub link.

7. The method of claim 1, wherein determining the initial transmit power for each hub and for each RBM comprises retrieving stored data comprising an initial power for each hub and for each RBM resulting from a previous parameter training phase.

8. The method of claim 1, wherein determining the initial transmit power for each hub and for each RBM comprises retrieving stored data comprising an estimated initial power for each hub and for each RBM.

9. The method of claim 1, wherein IoT values are predicted using a time sliding window, wherein, for hub i, the IoT can be estimated using:

$$IoT_i^{linear}(t)=a\left(\frac{\sum_{k\neq i} P_{l\in hub(k)}^{RBM} g_{il}+\mu}{n}\right)+(1-a)IoT_i^{linear}(t-1)$$

where $0\leq a\leq 1$, $IoT_i^{dB}(t)=10\log_{10}(IoT_i^{linear}(t))$, $\mu$ is the system phase noise.

10. The method of claim 1, wherein the predicted uplink CINR in dB of RBM j at hub i is computed as $$\widetilde{CINR}_{ij}^{UL}=10\log_{10}\left(\frac{P_{j\in hub(i)}^{RBM} g_{ij}}{(IoT_i^{linear}+1)n}\right)$$

where $P_{j\in hub(i)}^{RBM}$ is transmit power (linear) of RBM j in hub i with hub(i) being a set of RBMs served by hub i, $$g_{ij}=10\wedge\left(-\frac{PL_{ij}}{10}\right)$$

is the channel gain (linear) from hub i to RBM j, $PL_{ij}$ is the pathloss [dB] from hub i to RBM j, and n is the background noise power;

and a modulation and coding scheme (MCS) for the uplink transmission is selected based on this $\widetilde{CINR}_{ij}^{UL}$ value;

the transmit power is determined by setting the estimated $\widetilde{CINR}_{ij}^{UL}$ to be the same as the downlink CINR observed by the RBM; and the downlink CINR (dB) of RBM j from hub i is given by:

$$CINR_{ij}^{DL}=10\log_{10}\left(\frac{P_i^{hub} g_{ij}}{\sum_{k\neq i} P_k^{hub} g_{kj}+n}\right)$$

where $P_i^{hub}$ is the transmit power (linear) of hub i;

and from the serving pathloss from its serving hub, the target IoT at its serving hub and its target estimated uplink CINR, computing $P_{j\in hub(i)}^{RBM}$ as follows:

$$P_{j\in hub(i)}^{RBM}=\max\{\min\{\gamma_{ij}CINR_{ij}^{DL}+IoT_i^{dB}+PL_{ij}, P^{max}\}, P^{min}\},$$

where $\gamma_{ij}$ is a priority of RBM j in hub i.

11. The method of claim 1, wherein in the parameter training phase, all hubs transmit at $P_0^{hub}$ and each RBM measures its received downlink CINR from its serving hub and reports the downlink CINR along with its serving pathloss to a processing unit;

all RBMs transmit at $P_0^{RBM}$ and each hub measures its IoT over time, $$S_{IoT_i^{linear}}=\{IoT_i^{linear}(t_1), IoT_i^{linear}(t_2), \ldots IoT_i^{linear}(t_T)\}$$

where $S_{IoT_i^{linear}}$ is a set of IoTs values observed by hub i in time; and the step of IoT reporting comprises:

a) each hub obtains a desired post-processed IoT value by the end of the training phase $$IoT_i^{linear}=f\left(S_{IoT_i^{linear}}\right),$$

e.g. determines a minimum, mean or maximum IoT, and reports this post-processed IoT to the processing unit; or b) each hub reports a set of IoT vales to the processing unit, and the processing unit then determines a desired post-processed IoT for each hub.

12. The method of claim 1, wherein the target received uplink CINR of an RBM is set as its SLA target.

13. A system for uplink power control in a backhaul network comprising a plurality of nodes, wherein each node comprises at least one hub module, each hub module serving one or more Remote Backhaul Modules (RBMs) through hub-RBM radio links, the system comprising one or more processing units for coordinating uplink power control, wherein said one or more processing units are configured to implement the steps of:

obtaining for each hub an interference-over-thermal noise (IoT) value;

obtaining for each RBM a target uplink carrier-to-interference-plus-noise ratio (CINR) and a total path loss to its serving hub;

storing the obtained IoT values in data storage means associated with one or more of said processing units;

determining for each RBM a target IoT value;

for each RBM, computing a respective RBM uplink transmit power comprising summing the target IoT value for said RBM, the total path loss of said RBM to its serving hub, and the target uplink CINR for said RBM, and selecting said respective RBM uplink transmit power with constraints of a maximum power and a minimum power; and configuring each RBM to transmit at said respective uplink transmit power.

14. A system according to claim 13, wherein wherein said one or more processing units comprise a centralized processing unit of a centralized control server, the centralized control server being configured to perform the steps of:

providing commands to each hub comprising a transmit power and commands to each RBM via its serving comprising an respective RBM uplink transmit power;

receiving and storing data reported by the hub, and by the RBM via their serving hub, said data comprising said IoT values for each hub, said total pathloss for hub-RBM links from each hub to each served RBM, and said target uplink CINR for each RBM;

determining from said data a target IoT for each RBM;

computing from said target IoT and said data, the respective RBM uplink transmit power for each RBM;

providing commands to each RBM, via its serving hub, comprising a respective RBM uplink transmit power.

15. The system of claim 13, wherein said one or more processing units comprise a plurality of distributed processing units, and wherein a said processing unit of each respective hub is configured to perform the steps of:

providing commands to each served RBM comprising an initial RBM uplink transmit power;

receiving and storing data from each served RBM, said data comprising a measured total pathloss from the respective hub to each served RBM;

determining from said data a target IoT for each RBM;

computing from said target IoT and said data, the respective RBM uplink transmit power for each RBM; and issuing to each served RBM a command comprising the respective RBM uplink transmit power.

16. The system of claim 13, wherein said one or more processing units comprise a plurality of distributed processing units, and wherein a said processing unit of each respective hub is configured to perform the steps of:

providing commands to each served RBM comprising an initial RBM uplink transmit power;

receiving and storing data from each served RBM, said data comprising a measured total pathloss from the respective hub to each served RBM;

determining from said data a target IoT for served RBM and reporting a respective target IoT to each served RBM; and wherein each RBM is configured for computing its own respective RBM uplink transmit power comprising summing the target IoT value for said RBM, the total path loss of said RBM to its serving hub, and the target uplink CINR for said RBM, selecting said respective RBM uplink transmit power with constraints of a maximum power and a minimum power; and configuring itself to transmit at said respective uplink transmit power.

17. The system of claim 16, wherein the hub processing units further perform measurements of performance metrics, communicate performance metrics and other data to the centralized server for storage and look-up and optionally share data directly with co-located hubs.

18. The system of claim 17, wherein said one or more processing units comprise a processing unit of a centralized server, and the centralized server stores performance metrics for each hub-RBM radio link for look-up and coordinates obtaining performance metrics for each hub-RBM radio link, by performing RFEC measurements.

19. The system of claim 18, wherein the centralized server coordinates obtaining a performance metrics and computing RBM uplink transmit powers.

20. A non-transitory computer readable storage medium storing reported data and storing programming instructions for execution by one or more processing units of a fixed wireless backhaul network comprising a plurality of nodes, wherein each node comprises at least one hub module, and each hub module serves one or more remote backhaul modules (RBMs) through hub-RBM radio links, said non-transitory computer readable storage medium being centralized or distributed amongst said nodes, and said programming instructions implementing, in one or more of said processing units, the steps of:

obtaining for each hub an interference-over-thermal noise (IoT) value;

obtaining for each RBM a target uplink carrier-to-interference-plus-noise ratio (CINR) and a total path loss to its serving hub;

storing the obtained IoT values in data storage means associated with one or more of said processing units;

determining for each RBM a target IoT value;

for each RBM, determining a respective RBM uplink transmit power comprising summing the target IoT value for said RBM, the total path loss of said RBM to its serving hub, and the target uplink CINR for said RBM, and selecting said respective RBM uplink transmit power with constraints of a maximum power and a minimum power; and issuing commands to each RBM to transmit at said respective uplink transmit power.

* * * * *